(12) United States Patent
Lin et al.

(10) Patent No.: US 12,332,525 B2
(45) Date of Patent: Jun. 17, 2025

(54) ARRAY SUBSTRATE AND DISPLAY PANEL

(71) Applicant: TCL CHINA STAR OPTOELECTRONICS TECHNOLOGY CO., LTD., Guangdong (CN)

(72) Inventors: Youhuang Lin, Guangdong (CN); Zhiming Zhan, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/611,521

(22) PCT Filed: Oct. 12, 2021

(86) PCT No.: PCT/CN2021/123267
§ 371 (c)(1),
(2) Date: Apr. 6, 2023

(87) PCT Pub. No.: WO2023/050471
PCT Pub. Date: Apr. 6, 2023

(65) Prior Publication Data
US 2024/0045288 A1    Feb. 8, 2024

(30) Foreign Application Priority Data
Sep. 29, 2021  (CN) .......................... 202111152323.9

(51) Int. Cl.
*G02F 1/1362*        (2006.01)
*G02F 1/1335*        (2006.01)
(Continued)

(52) U.S. Cl.
CPC .. *G02F 1/136286* (2013.01); *G02F 1/133514* (2013.01); *G02F 1/134345* (2021.01);
(Continued)

(58) Field of Classification Search
CPC ......... G02F 1/136286; G02F 1/136259; G02F 1/136272; G02F 1/134345;
(Continued)

(56) References Cited

U.S. PATENT DOCUMENTS 6,839,117 B1 *   1/2005  Park ................. G02F 1/133707
                                                        349/141
2003/0090599 A1 *  5/2003  Ochiai ............. G02F 1/136213
                                                         349/39
(Continued)

FOREIGN PATENT DOCUMENTS

CN            1551079 A      12/2004
CN          102375275 A       3/2012
(Continued)

OTHER PUBLICATIONS

Chinese Office Action issued in corresponding Chinese Patent Application No. 202111152323.9 dated Apr. 12, 2022, pp. 1-10.
(Continued)

*Primary Examiner* — Hoan C Nguyen
(74) *Attorney, Agent, or Firm* — PV IP PC; Wei Te Chung

(57) ABSTRACT

An array substrate and a display panel are provided. The array substrate includes a plurality of pixels, a plurality of data lines, a plurality of gate lines, a plurality of shared electrode lines, a plurality of common electrode lines, and a shared electrode bus line. Each pixel includes a first sub-pixel and a second sub-pixel. In each pixel rows, a first sub-pixel row and an adjacent second sub-pixel row are separated by a first interval. Each gate line is disposed in a corresponding first interval. Each shared electrode line is disposed in the corresponding first interval and is adjacent to a corresponding gate line. Each common electrode line is disposed between two adjacent first intervals. The shared
(Continued)

electrode bus line is connected to the plurality of shared electrode lines.

18 Claims, 6 Drawing Sheets

(51) Int. Cl.
*G02F 1/1343* (2006.01)
*G02F 1/1368* (2006.01)
(52) U.S. Cl.
CPC ........ *G02F 1/13624* (2013.01); *G02F 1/1368* (2013.01); *G02F 2201/124* (2013.01)
(58) Field of Classification Search
CPC ......... G02F 1/134354; G02F 1/134318; G02F 1/134363; G02F 1/134372; G02F 1/133514; G02F 1/13624; G02F 1/1368; G02F 2201/124; G02F 1/133345; G02F 1/134309; G02F 1/133512; G02F 1/13439; G02F 1/133711; G02F 1/13306; G02F 1/133707; G02F 1/133757; G02F 1/136227; G02F 1/136213; G02F 1/133753; G06F 3/0412; G06F 3/04164; G06F 3/0421; G06F 3/0416; G06F 3/042; H01L 27/1248; H01L 27/1288; H10D 86/0231; H10D 86/60; H10D 86/451
See application file for complete search history.

(56) References Cited

U.S. PATENT DOCUMENTS

| | | | | |
|---|---|---|---|---|
| 2003/0128323 | A1* | 7/2003 | Matsumoto | G02F 1/134363 |
| | | | | 349/141 |
| 2006/0077313 | A1* | 4/2006 | Liu | G02F 1/136259 |
| | | | | 349/55 |
| 2008/0239215 | A1* | 10/2008 | Chae | G09G 3/3648 |
| | | | | 349/107 |
| 2009/0152552 | A1* | 6/2009 | Ku | H01L 27/124 |
| | | | | 257/E21.535 |
| 2010/0033664 | A1* | 2/2010 | Lee | G02F 1/1345 |
| | | | | 349/139 |
| 2012/0182510 | A1* | 7/2012 | Kim | G02F 1/133711 |
| | | | | 349/130 |
| 2012/0281172 | A1* | 11/2012 | Park | G02F 1/133707 |
| | | | | 349/123 |
| 2014/0104523 | A1* | 4/2014 | Jung | G02F 1/1343 |
| | | | | 349/41 |
| 2016/0357069 | A1 | 12/2016 | Park et al. | |
| 2017/0108723 | A1* | 4/2017 | No | G02F 1/133345 |
| 2020/0103688 | A1 | 4/2020 | Lee et al. | |
| 2021/0294168 | A1 | 9/2021 | Chen | |

FOREIGN PATENT DOCUMENTS

| | | |
|---|---|---|
| CN | 103137617 A | 6/2013 |
| CN | 104698703 A | 6/2015 |
| CN | 105093740 A | 11/2015 |
| CN | 107329296 A | 11/2017 |
| CN | 107490912 A | 12/2017 |
| CN | 108445684 A | 8/2018 |
| CN | 110308597 A | 10/2019 |
| CN | 110931512 A | 3/2020 |
| CN | 110967882 A | 4/2020 |
| CN | 112799255 A | 5/2021 |
| CN | 113075825 A | 7/2021 |
| CN | 213750598 U | 7/2021 |
| EP | 3869264 A1 | 8/2021 |
| JP | 2009175705 A | 8/2009 |
| KR | 20150017527 A | 2/2015 |
| KR | 20200032805 A | 3/2020 |

OTHER PUBLICATIONS

International Search Report in International application No. PCT/CN2021/123267, mailed on Jun. 23, 2022.
Written Opinion of the International Searching Authority in International application No. PCT/CN2021/123267, mailed on Jun. 23, 2022.
Japanese Office Action issued in corresponding Japanese Patent Application No. 特願 2021-562387 dated Jan. 29, 2024, pp. 1-3.

* cited by examiner

ARRAY SUBSTRATE AND DISPLAY PANEL

RELATED APPLICATIONS

This application is a Notional Phase of PCT Patent Application No. PCT/CN2021/123267 having international filing date of Oct. 12, 2021, which claims the benefit of priority of Chinese Patent Application No. 202111152323.9 filed on Sep. 29, 2021. The contents of the above applications are all incorporated by reference as if fully set forth herein in their entirety.

FIELD OF DISCLOSURE

The present disclosure relates to the field of display technologies, and in particular to an array substrate and a display panel.

BACKGROUND

Referring to FIG. 1, which shows a schematic diagram of an array substrate 10 in the prior art. The array substrate 10 includes data lines 11, a gate line 12, common electrodes 13, a common electrode 14, a first transistor 15, a second transistor 16, and a third transistor 17. FIG. 1 shows a pixel unit in the array substrate 10, which includes a first sub-pixel 18 and a second sub-pixel 19.

As shown in FIG. 1, the shared electrode 14 extends from the first sub-pixel 18 to the second sub-pixel 19, and a portion of the shared electrode 14 is disposed on an opening area of the pixel unit. In order to prevent light leakage, a metal layer slightly wider than the shared electrode 14 needs to be disposed under the shared electrode 14. That is, a portion of the common electrode 13 extends to the opening area (display area) of the pixel unit. However, the use of the above-mentioned wider common electrode 13 design will result in a reduction in an aperture. Secondly, the common electrode 13 disposed in the opening area of the pixel unit will increase a reflectivity. Furthermore, the shared electrode 14 extending longitudinally through a plurality of the pixel units has a risk of broken crossover line and short circuit.

On the other hand, in a traditional manufacturing method of the array substrate 10, a four-photomask process is widely used. That is, the gate lines 12 and the common electrodes 13 are formed in a first metal layer. The data lines 11, the shared electrode 14, and sources and drains of the transistors 15/16/17 are formed in a second metal layer. Therefore, due to a limitation of the manufacturing process, the shared electrode 14 will limit a layout design of other components on the same layer.

SUMMARY OF DISCLOSURE

In order to solve the above-mentioned problems of the prior art, a purpose of the present disclosure is to provide an array substrate and a display panel, which can prevent a color shift of a display panel at large viewing angles, and can further increase an aperture of the display panel, improve the process quality, and reduce a reflectivity.

In order to achieve the above purpose, the present disclosure provides an array substrate, including a display area and a non-display area surrounding the display area; a plurality of pixels disposed in the display area, wherein each of the pixels includes a first sub-pixel and a second sub-pixel arranged along a column direction, the plurality of pixels include a plurality of pixel rows and a plurality of pixel columns, and in each of the pixel rows, a first sub-pixel row and an adjacent second sub-pixel row are separated by a first interval, and two adjacent pixel rows are separated by a second interval; a plurality of data lines extending along the column direction and connected to the plurality of pixel columns; a plurality of gate lines extending along a row direction and connected to the plurality of pixel rows, wherein each of the gate lines is disposed in a corresponding first interval; a plurality of shared electrode lines extending along the row direction, wherein each of the shared electrode lines is disposed in a corresponding first interval and is adjacent to a corresponding gate line; a plurality of common electrode lines, wherein each of the common electrode lines is disposed between two adjacent first intervals, each of the common electrode lines includes a main electrode and a plurality of comb-shaped electrodes, the main electrode extends along the row direction and disposed in a corresponding second interval, and the plurality of comb-shaped electrodes extend along the column direction and extend toward at least one adjacent first interval; a shared electrode bus line extending along the column direction, disposed in the non-display area, and connected to the plurality of shared electrode lines; and a common electrode bus line extending along the column direction, disposed in the non-display area, and connected to each of the main electrodes.

In some embodiment, the plurality of gate lines, the plurality of shared electrode lines, and the plurality of common electrode lines are arranged on a first metal layer; and the shared electrode bus line is arranged in the first metal layer, or the shared electrode bus line and the plurality of data lines are arranged in a second metal layer. The present disclosure also provides an array substrate, including: a display area and a non-display area surrounding the display area; a plurality of pixels disposed in the display area, wherein each of the pixels includes a first sub-pixel and a second sub-pixel arranged along a column direction, the plurality of pixels include a plurality of pixel rows and a plurality of pixel columns, and in each of the pixel rows, a first sub-pixel row and an adjacent second sub-pixel row are separated by a first interval; a plurality of data lines extending along the column direction and connected to the plurality of pixel columns; a plurality of gate lines extending along a row direction and connected to the plurality of pixel rows, wherein each of the gate lines is disposed in a corresponding first interval; a plurality of shared electrode lines extending along the row direction, wherein each of the shared electrode lines is disposed in a corresponding first interval and is adjacent to a corresponding gate line; a plurality of common electrode lines, wherein each of the common electrode lines is disposed between two adjacent first intervals; and a shared electrode bus line extending along the column direction, disposed in the non-display area, and connected to the plurality of shared electrode lines.

In some embodiment, the plurality of gate lines, the plurality of shared electrode lines, and the plurality of common electrode lines are arranged on a first metal layer.

In some embodiment, the shared electrode bus line is arranged on the first metal layer.

In some embodiment, wherein the plurality of shared electrode lines and the shared electrode bus line are arranged on different layers, and the shared electrode bus line and the plurality of data lines are arranged on a second metal layer.

In some embodiment, the array substrate further includes a plurality of repair electrodes, wherein the plurality of repair electrodes are connected to the plurality of common electrode lines.

In some embodiment, the array substrate further includes a base, wherein in one of the pixels, the first sub-pixel includes a first pixel electrode, and the second sub-pixel includes a second pixel electrode; and orthographic projections of the first pixel electrode and the second pixel electrode on the base overlap with an orthographic projection of at least one of the repair electrodes on the base.

In some embodiment, the array substrate further includes a base, wherein an orthographic projection of the plurality of shared electrode lines on the base and an orthographic projection of the plurality of common electrode lines on the base do not overlap with each other.

In some embodiment, in one of the pixels, the pixel includes a shared thin film transistor, the first sub-pixel includes a first thin film transistor and a first pixel electrode, and the second sub-pixel includes a second thin film transistor and a second pixel electrode; gates of the shared thin film transistor, the first thin film transistor, and the second thin film transistor are connected to a same gate line; sources of the first thin film transistor and the second thin film transistor are connected to a same data line; a drain of the first thin film transistor is connected to the first pixel electrode, and a drain of the second thin film transistor is connected to the second pixel electrode; a drain of the shared thin film transistor is connected to the drain of the second thin film transistor, a source of the shared thin film transistor is connected to one of the shared electrode lines, and the gate line and the shared electrode line respectively connected to the gate and the source of the shared thin film transistor are disposed in a same first interval.

In some embodiment, two adjacent pixel rows are separated by a second interval; each of the common electrode lines includes a main electrode and a plurality of comb-shaped electrodes; the main electrode extends along the row direction and is disposed in a corresponding second interval; the plurality of comb-shaped electrodes extend along the column direction and extend toward at least one adjacent first interval; and the array substrate further includes a common electrode bus line extending along the column direction, disposed in the non-display area, and connected to each of the main electrodes.

The present disclosure also provides a display panel, including: an array substrate; a color filter substrate disposed opposite to the array substrate; and a liquid crystal layer disposed between the array substrate and the color filter substrate. The array substrate includes: a display area and a non-display area surrounding the display area; a plurality of pixels disposed in the display area, wherein each of the pixels includes a first sub-pixel and a second sub-pixel arranged along a column direction, the plurality of pixels include a plurality of pixel rows and a plurality of pixel columns, and in each of the pixel rows, a first sub-pixel row and an adjacent second sub-pixel row are separated by a first interval; a plurality of data lines extending along the column direction and connected to the plurality of pixel columns; a plurality of gate lines extending along a row direction and connected to the plurality of pixel rows, wherein each of the gate lines is disposed in a corresponding first interval; a plurality of shared electrode lines extending along the row direction, wherein each of the shared electrode lines is disposed in a corresponding first interval and is adjacent to a corresponding gate line; a plurality of common electrode lines, wherein each of the common electrode lines is disposed between two adjacent first intervals; and a shared electrode bus line extending along the column direction, disposed in the non-display area, and connected to the plurality of shared electrode lines.

In some embodiment, the plurality of gate lines, the plurality of shared electrode lines, and the plurality of common electrode lines are arranged on a first metal layer.

In some embodiment, the shared electrode bus line is arranged on the first metal layer.

In some embodiment, the plurality of shared electrode lines and the shared electrode bus line are arranged on different layers, and the shared electrode bus line and the plurality of data lines are arranged on a second metal layer.

In some embodiment, the array substrate further includes a plurality of repair electrodes, and the plurality of repair electrodes are connected to the plurality of common electrode lines.

In some embodiment, the array substrate further includes a base, wherein in one of the pixels, the first sub-pixel includes a first pixel electrode, and the second sub-pixel includes a second pixel electrode; and orthographic projections of the first pixel electrode and the second pixel electrode on the base overlap with an orthographic projection of at least one of the repair electrodes on the base.

In some embodiment, the array substrate further includes a base, wherein an orthographic projection of the plurality of shared electrode lines on the base and an orthographic projection of the plurality of common electrode lines on the base do not overlap with each other.

In some embodiment, in one of the pixels, the pixel includes a shared thin film transistor, the first sub-pixel includes a first thin film transistor and a first pixel electrode, and the second sub-pixel includes a second thin film transistor and a second pixel electrode; gates of the shared thin film transistor, the first thin film transistor, and the second thin film transistor are connected to a same gate line; sources of the first thin film transistor and the second thin film transistor are connected to a same data line; a drain of the first thin film transistor is connected to the first pixel electrode, and a drain of the second thin film transistor is connected to the second pixel electrode; a drain of the shared thin film transistor is connected to the drain of the second thin film transistor, a source of the shared thin film transistor is connected to one of the shared electrode lines, and the gate line and the shared electrode line respectively connected to the gate and the source of the shared thin film transistor are disposed in a same first interval.

In some embodiment, two adjacent pixel rows are separated by a second interval; each of the common electrode lines includes a main electrode and a plurality of comb-shaped electrodes; the main electrode extends along the row direction and is disposed in a corresponding second interval; the plurality of comb-shaped electrodes extend along the column direction and extend toward at least one adjacent first interval; and the array substrate further includes a common electrode bus line extending along the column direction, disposed in the non-display area, and connected to each of the main electrodes.

In comparison with the prior art, the shared electrode lines of the present disclosure are separated from the common electrode lines, and the shared electrode lines do not extend to the opening area of the pixels, so the aperture can be effectively increased.

BRIEF DESCRIPTION OF DRAWINGS

The following describes specific embodiments of the present disclosure in detail with reference to the accompanying drawings to make technical solutions and other beneficial effects of the present disclosure obvious.

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

Figure 2:
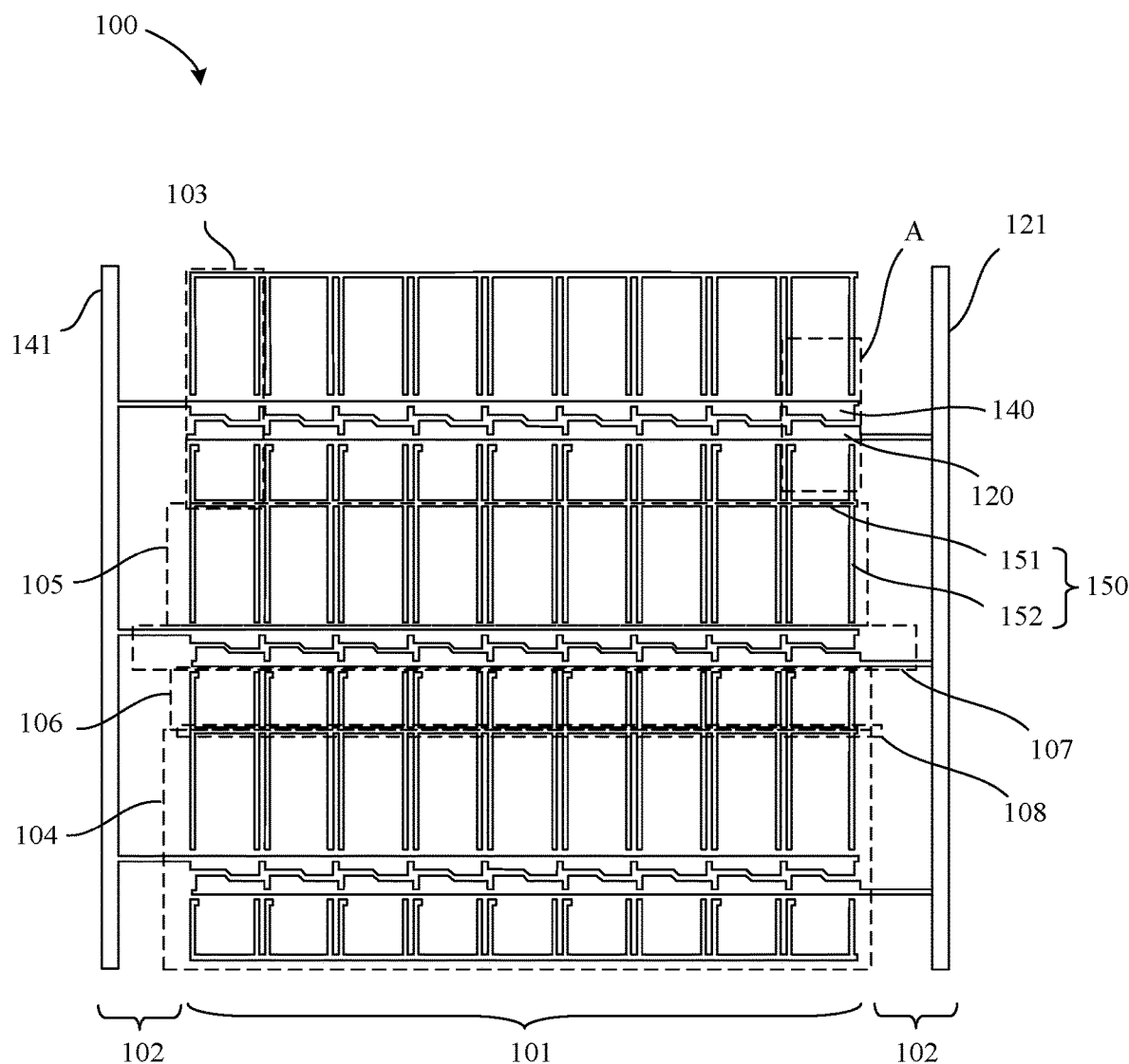
FIG. 2 shows a schematic diagram of a first metal layer of an array substrate according to a first embodiment of the present disclosure.
Figure 3:
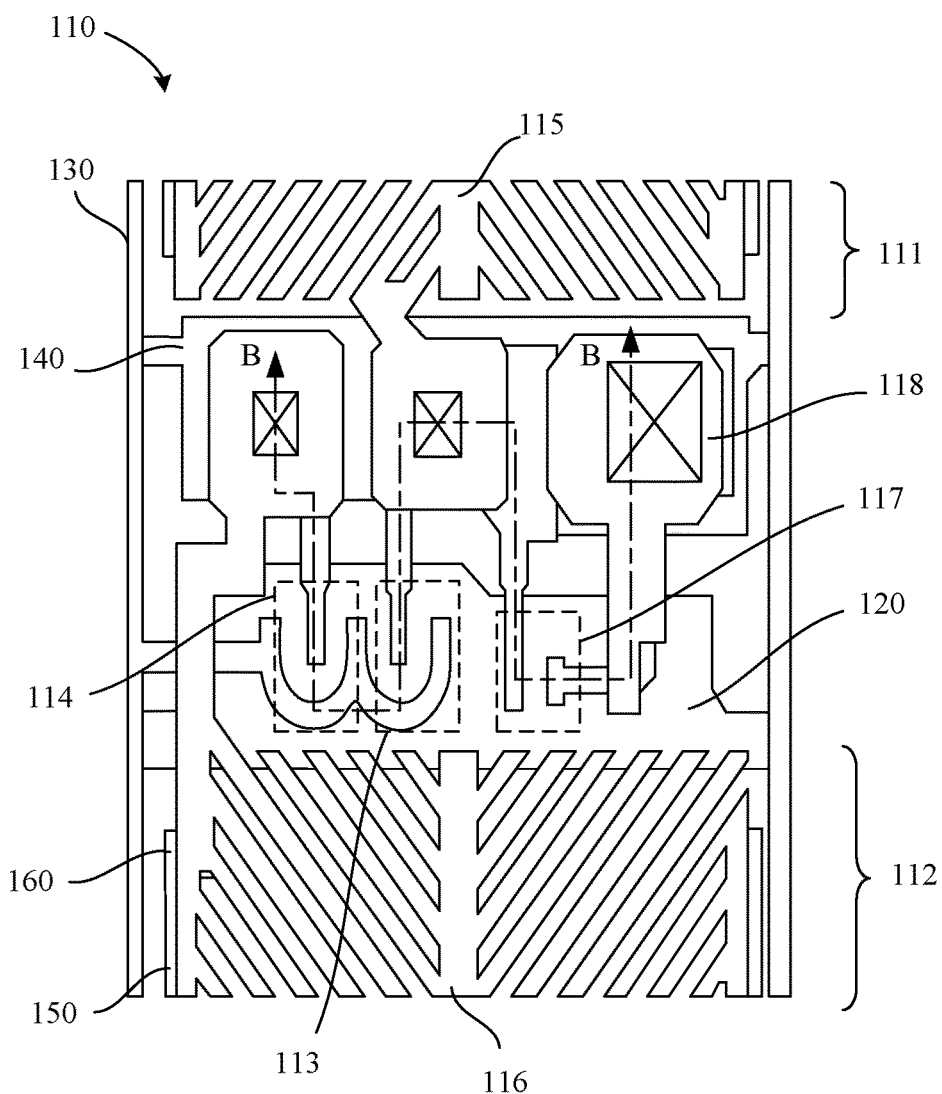
FIG. 3 shows a schematic diagram of a pixel structure of a portion A of FIG. 2.

Referring to FIG. 2 and FIG. 3, FIG. 2 shows a schematic diagram of a first metal layer of an array substrate according to a first embodiment of the present disclosure, and FIG. 3 shows a schematic diagram of a pixel structure of a portion A of FIG. 2. The array substrate 100 includes a display area 101, a non-display area 102, a plurality of pixels 110, a plurality of gate lines 120, a plurality of data lines 130, a plurality of shared electrode lines 140, a plurality of common electrode lines 150, a shared electrode bus line 141, and a gate driver 121. A pixel area 103 shown in FIG. 2 corresponds to an area of one pixel 110. The data lines 130 and the shared electrode bus line 141 extend along a column direction, and the gate lines 120 and the shared electrode lines 140 extend along a row direction.

As shown in FIG. 2, the non-display area 102 surrounds the display area 101. The plurality of pixels 110 are disposed in the display area 101. The shared electrode bus line 141 and the gate driver 121 are arranged in the non-display area 102. All gate lines 120 extend from the display area 101 to the non-display area 102 and are connected to the gate driver 121. All the shared electrode lines 140 extend from the display area 101 to the non-display area 102, and are connected to the shared electrode bus line 141.

As shown in FIG. 3, each pixel 110 includes a first sub-pixel 111 and a second sub-pixel 112 arranged along the column direction. Also, as shown in FIG. 2, the plurality of pixels 110 includes a plurality of pixel rows 104 and a plurality of pixel columns. Each data line 130 is connected to one of the pixel columns, and each gate line 120 is connected to one of the pixel rows 104. In each pixel row 104, a first sub-pixel row 105 and an adjacent second sub-pixel row 106 are separated by a first interval 107. Each gate line 120 is disposed in the corresponding first interval 107, and each shared electrode line 140 is also disposed in the corresponding first interval 107 and is adjacent to the corresponding gate line 120. That is, in the corresponding first interval 107, the gate line 120 and the adjacent shared electrode line 140 are disposed. Each common electrode line 150 is disposed between two adjacent first intervals 107. In addition, two adjacent pixel rows 104 are separated by a second interval 108.

As shown in FIG. 3, each pixel 110 includes a shared thin film transistor 117. Moreover, in one pixel 110, the first sub-pixel 111 includes a first thin film transistor 113 and a first pixel electrode 115, and the second sub-pixel 112 includes a second thin film transistor 114 and a second pixel electrode 116.

As shown in FIG. 2, each common electrode line 150 includes a main electrode 151 and a plurality of comb-shaped electrodes 152. The main electrode 151 extends along the row direction and is disposed in the corresponding second interval 108. The comb-shaped electrodes 152 extend along the column direction and extend toward at least one adjacent first interval 107. As shown in FIG. 3, the common electrode line 150 partially overlap the pixel electrodes 115/116 to form a storage capacitor. It should be noted that in this embodiment, there are no common electrode lines 150 in the first interval 107 of the array substrate 100. Therefore, except for a side of the first pixel electrode 115 adjacent to the shared electrode lines 140, the common electrode line 150 overlaps remaining sides of the first pixel electrode 115. Also, except for a side of the second pixel electrode 116 adjacent to the gate line 120, the common electrode line 150 overlaps remaining sides of the second pixel electrode 116.

Figure 4:
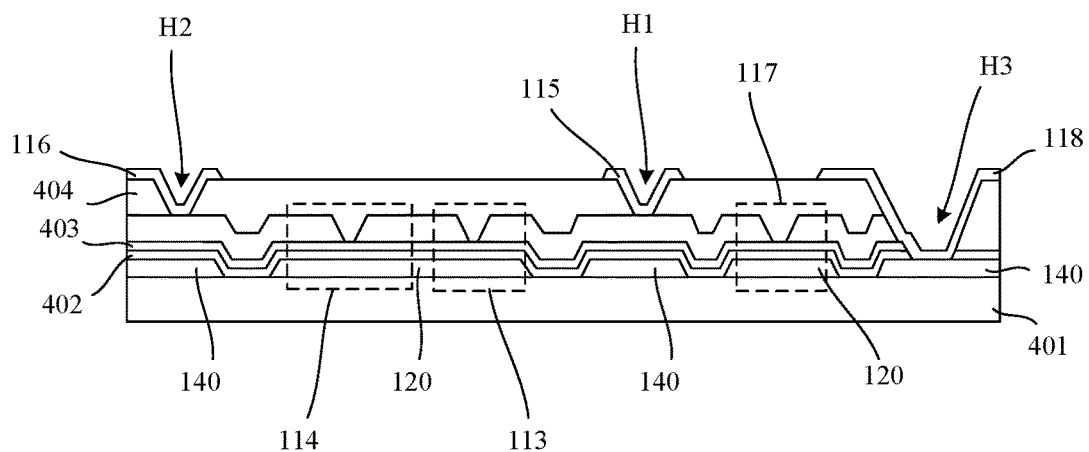
FIG. 4 shows a cross-sectional view of FIG. 3 along a line B-B.

Referring to FIG. 3 and FIG. 4, where FIG. 4 shows a cross-sectional view of FIG. 3 along a line B-B. The array substrate 100 further includes a base 401, a first insulating layer 402, an active layer 403, a second insulating layer 404, and a first connection electrode 118. The gate line 120 and the shared electrode line 140 are disposed on the base 401. The first insulating layer 402 is disposed on the base 401, the gate line 120, and the shared electrode line 140. The active layer 403 is disposed on the first insulating layer 402. Sources and drains of the first thin film transistor 113, the second thin film transistor 114, and the shared thin film transistor 117 are disposed on the active layer 403. The second insulating layer 404 is disposed on the sources and the drains of the first thin film transistor 113, the second thin film transistor 114, and the shared thin film transistor 117. Also, the second insulating layer 404 includes a first through hole H1, a second through hole H2, and a third through hole H3. The first through hole H1 is configured to expose the drain of the first thin film transistor 113. The second through hole H2 is configured to expose the drain of the second thin film transistor 114. The third through hole H3 is configured to expose the drain of the shared thin film transistor 117 and the shared electrode line 140.

As shown in FIG. 3 and FIG. 4, in one pixel 110, gates of the shared thin film transistor 117, the first thin film transistor 113, and the second thin film transistor 114 are connected to a same gate line 120. Moreover, the sources of the first thin film transistor 113 and the second thin film transistor 114 are connected to a same data line 130. The first pixel electrode 115 is disposed on the second insulating layer 404, and is connected to the drain of the first thin film transistor 113 through the first through hole H1. The second pixel electrode 116 is disposed on the second insulating layer 404, and is connected to the drain of the second thin film transistor 114 through the second through hole H2. The first connection electrode 118 is disposed on the second insulating layer 404 and covers a hole wall of the third through hole H3. The first connection electrode 118 is configured to connect the source of the shared thin film transistor 117 and the shared electrode lines 140. The drain of the shared thin film transistor 117 is connected to the drain of the first thin film transistor 113. In one pixel 110, the gate line 120 and the shared electrode line 140 respectively connected to the gate and source of the shared thin film transistor 117 are arranged adjacent to each other in the same first interval 107.

As shown in FIG. 3 and FIG. 4, in one pixel 110, the shared thin film transistor 117, the first thin film transistor 113, and the second thin film transistor 114 are controlled by the same gate line 120. When the gates are turned on, the first thin film transistor 113 and the second thin film transistor 114 charge the first pixel electrode 115 and the second pixel electrode 116 respectively. At the same time, the shared thin film transistor 117 leaks a part of the charge that has been charged in the first pixel electrode 115 to the shared electrode line 140 to lower a potential of the first sub-pixel 111. Therefore, a potential difference between the first sub-pixel 111 and the second sub-pixel 112 is ensured, thereby preventing a visible color shift of the display panel at wide viewing angles.

Figure 1:
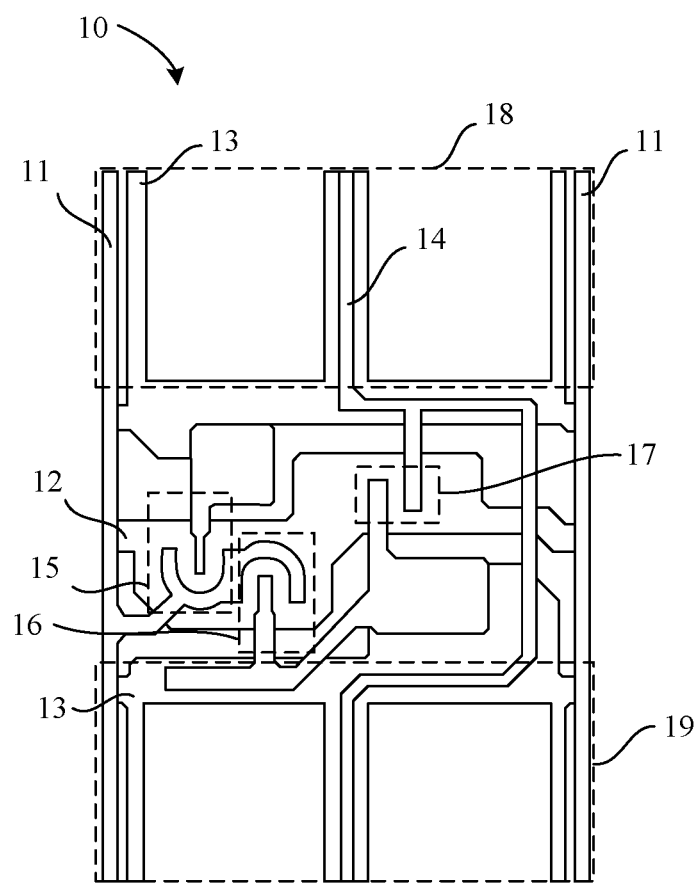
FIG. 1 shows a schematic diagram of an array substrate in the prior art.
Figure 5:
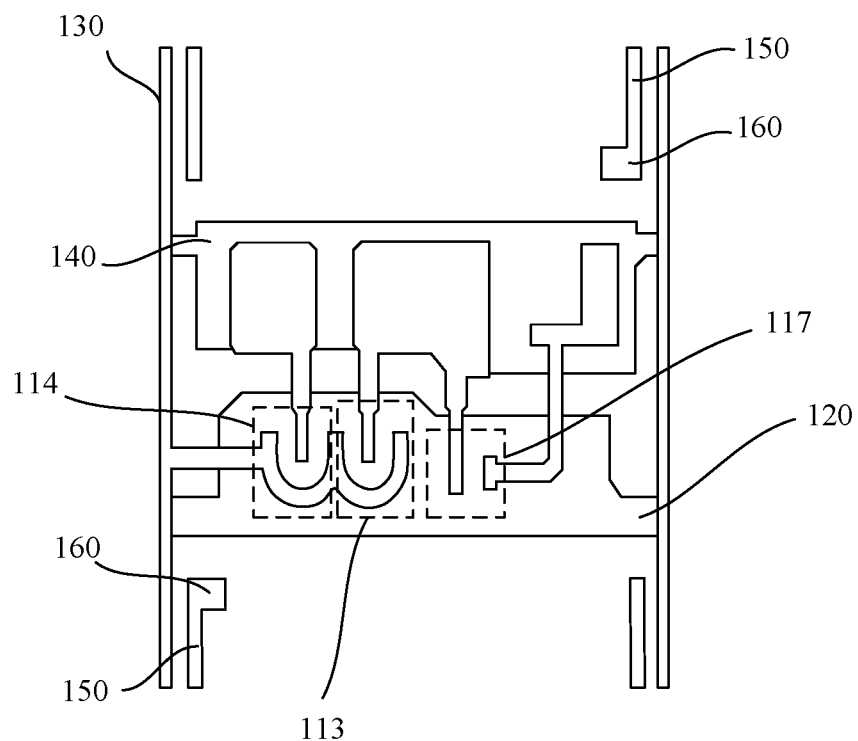
FIG. 5 shows a schematic diagram of the first metal layer and a second metal layer of the array substrate in FIG. 3.

Referring to FIG. 1 and FIG. 5, where FIG. 5 shows a schematic diagram of the first metal layer and a second metal layer of the array substrate of FIG. 3. The plurality of gate lines 120, the plurality of shared electrode lines 140, and the plurality of common electrode lines 150 are formed in the first metal layer. The plurality of data lines 130 and the sources and the drains of the first thin film transistor 113, the second thin film transistor 114, and the shared thin film transistor 117 are formed in the second metal layer. Since the electrode lines 140 and the gate lines 120 are arranged in the same layer, an orthographic projection of the shared electrode lines 140 on the base 401 and an orthographic projection of the common electrode lines 150 on the base 401 do not overlap with each other. In comparison with the prior art, the shared electrode lines 140 of the present disclosure are separated from the common electrode lines 150, and the shared electrode lines 140 do not extend to the display area of the pixels 110, so the aperture can be effectively increased. Secondly, the opening area of pixels 110 does not need to be provided with a metal layer to avoid light leakage, so a reflectivity can be reduced. Furthermore, since the shared electrode lines 140 are formed on the first metal layer which is a bottom layer of the array substrate, the shared electrode lines 140 do not need to use a crossover line design, which can prevent the problem of short circuit caused by a broken crossover line. On the other hand, since the shared electrode lines 140 are arranged in the same layer as the gate lines 120 and the common electrode lines 150, there is no need to add an additional metal layer, and it does not limit a layout design of the data lines and the sources and drains of the thin film transistors.

As shown in FIG. 3 and FIG. 5, the array substrate 100 further includes a plurality of repair electrodes 160. The repair electrodes 160 are connected to the common electrode lines 150. Specifically, each of the repair electrode 160 is connected to at least one comb-shaped electrode 152 of the common electrode line 150 extending to each sub-pixel. Preferably, the common electrode lines 150 are connected to ends of the comb-shaped electrodes 152. In some embodiments, the repair electrodes 160 and the common electrode lines 150 are formed on the same layer, that is, the two are integrally formed. For example, the repair electrodes 160 are formed at the ends of the common electrode lines 150. In each pixel 110, orthographic projections of the first pixel electrode 115 and the second pixel electrode 116 on the base correspondingly overlap with orthographic projections of the repair electrodes 160.

It should be understood that the repair electrodes 160 are configured to repair dark spots of pixels. Specifically, during a lighting test, it is detected that there is a bright spot caused by a short circuit. For this defect, the bright spot can be eliminated by using the repair electrodes 160. For example, a laser is used to irradiate one of the repair electrodes 160 to connect the common electrode line 150 with a corresponding pixel electrode. At this time, in the repaired pixel, since the common voltage difference between the array substrate 100 and the opposing color filter substrate is the same, the pixel will not emit light, and the dark spot repair is completed.

As shown in FIG. 2, in this embodiment, the shared electrode bus line 141 is formed on the first metal layer. Moreover, the shared electrode bus line 141 and the gate driver 121 are respectively arranged on opposite sides of the array substrate 100.

Figure 6:
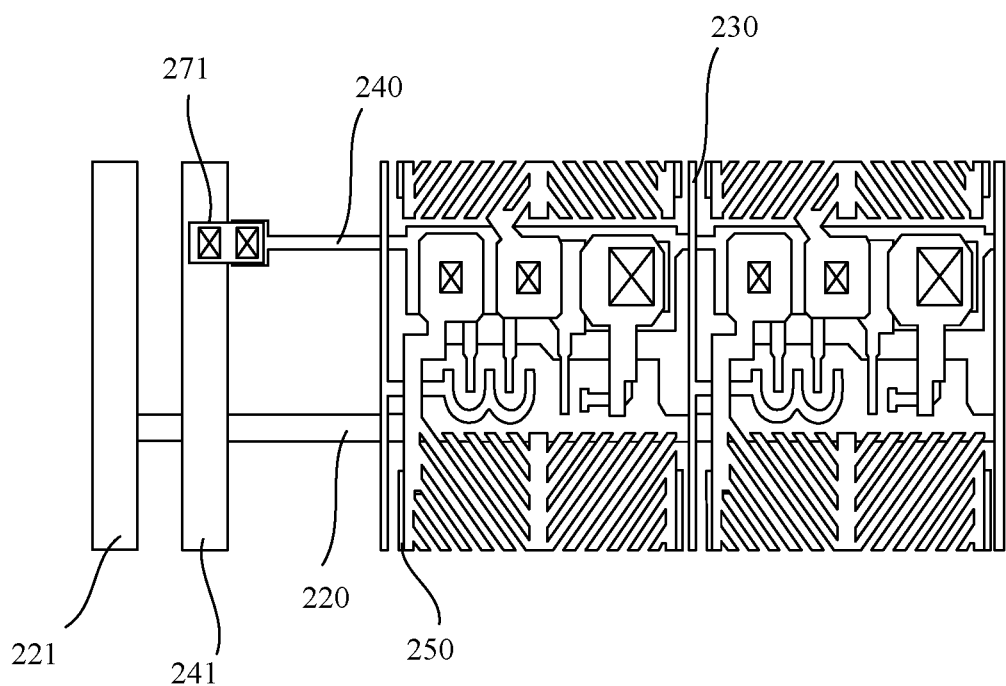
FIG. 6 shows a schematic diagram of an array substrate according to a second embodiment of the present disclosure.

Referring to FIG. 6, which shows a schematic diagram of an array substrate according to a second embodiment of the present disclosure. In the second embodiment, gate lines 220, shared electrode lines 240, and common electrode lines 250 are formed in a first metal layer, and data lines 230 are formed in a second metal layer. An array substrate 200 of the second embodiment is substantially the same as the array substrate 100 of the first embodiment. A difference between the two is that a shared electrode bus line 241 of the array substrate 200 of the second embodiment is formed on the second metal layer, and a gate driver 221 and the shared electrode bus line 241 are disposed on a same side of the array substrate 200. The shared electrode bus line 241 is connected to the shared electrode lines 240 through second connection electrodes 271. On the other hand, a design of each element in the display area of the array substrate 200 is the same as that of the first embodiment, and will not be repeated here.

Figure 7:
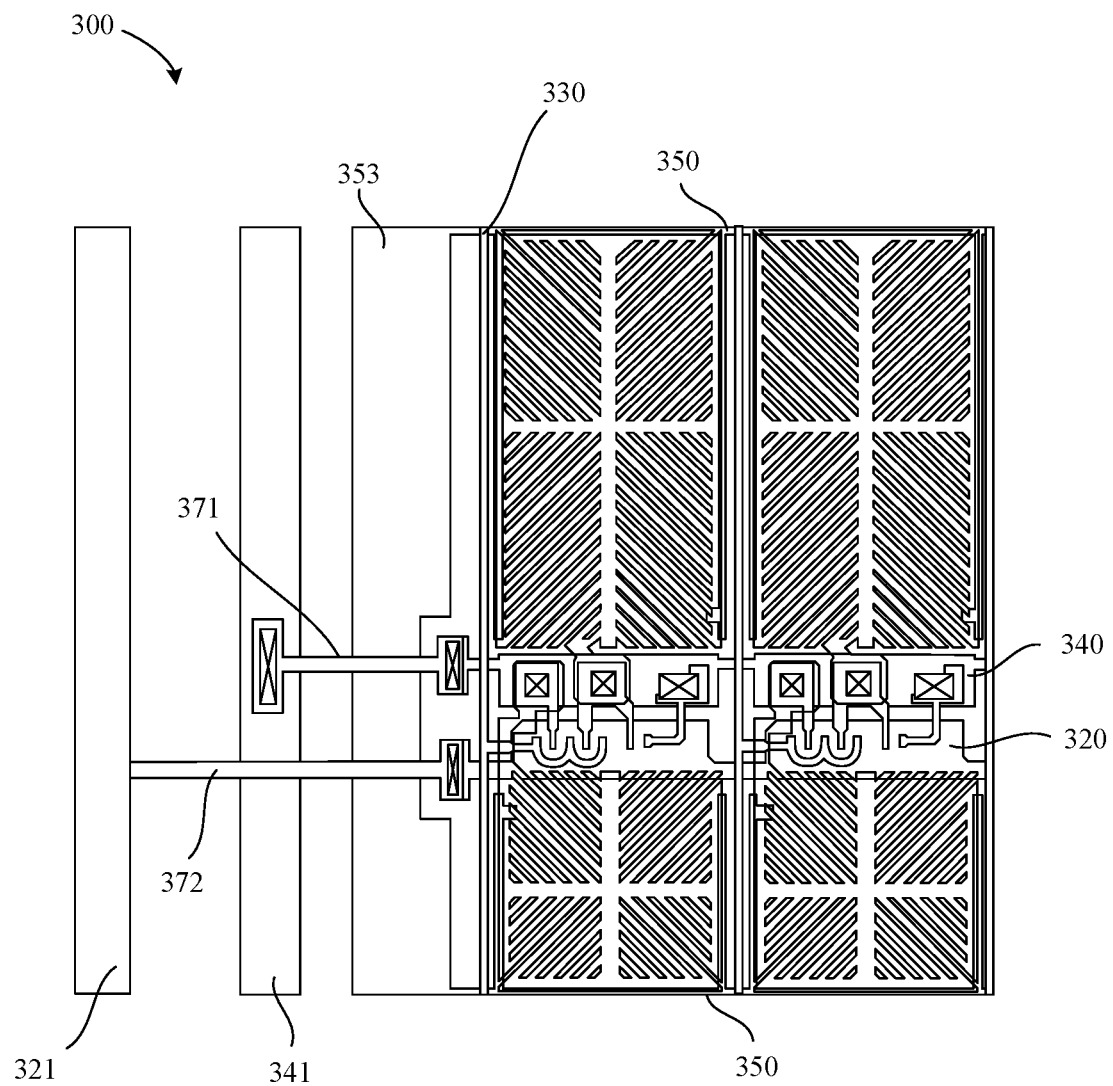
FIG. 7 shows a schematic diagram of an array substrate according to a third embodiment of the present disclosure.

Referring to FIG. 7, which shows a schematic diagram of an array substrate according to a third embodiment of the present disclosure. In the third embodiment, an array substrate 300 further includes a common electrode bus line 353, which is connected to main electrodes of all common electrode lines 350. The common electrode bus line 353 extends along the column direction and is disposed in the non-display area. Gate lines 320, shared electrode lines 340, a shared electrode bus line 341, common electrode lines 350, and the common electrode bus line 353 are formed on the first metal layer. Data lines 330 are formed on the second metal layer. A gate driver 321, the shared electrode bus line 341, and the common electrode bus line 353 are arranged on the same side of the array substrate 300. The shared electrode bus line 341 is connected to the shared electrode lines 340 through second connection electrodes 371. The common electrode bus line 353 is connected to the common electrode lines 350 through third connecting electrode 372. On the other hand, the design of each element in the display area of the array substrate 300 is the same as that of the first embodiment, and will not be repeated here.

Figure 8:
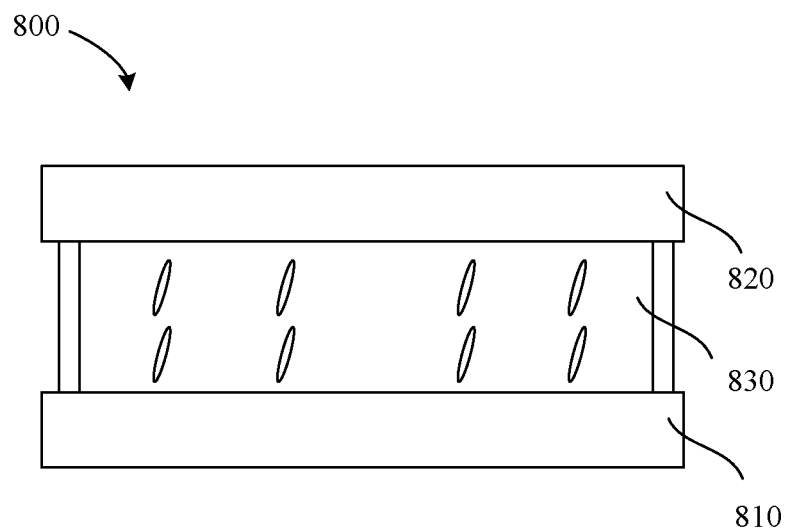
FIG. 8 shows a display panel according to an embodiment of the present disclosure.

Referring to FIG. 8, which shows a display panel according to an embodiment of the present disclosure. The display panel 800 includes an array substrate 810, a color filter substrate 820, and a liquid crystal layer 830. The array substrate 810 can be any one of the above-mentioned array substrates. The color filter substrate 820 and the array substrate 810 are arranged opposite to each other. The liquid crystal layer 830 is disposed between the color filter substrate 820 and the array substrate 810.

In summary, by setting the shared electrode lines in the present disclosure, a potential difference between two adjacent sub-pixels can be ensured, thereby preventing the visible color shift of the display panel at wide viewing angles. On the other hand, in comparison to the prior art, the shared electrode lines of the present disclosure are separated from the common electrode lines, and the shared electrode lines do not extend to the opening area of the pixels, so the aperture can be effectively increased. Secondly, the opening area of the pixels does not need to be provided with a metal layer to avoid light leakage, so the reflectivity can be reduced. Furthermore, since the shared electrode lines are formed on the first metal layer which is the bottom layer of the array substrate, the shared electrode lines do not need to adopt a crossover line design, thereby preventing the problem of short circuit caused by the broken crossover line. In addition, since the shared electrode lines are arranged on the same layer as the gate lines and common electrode lines, there is no need to add an additional metal layer, and it does not limit the layout design of the data lines and the sources and the drains of the thin film transistors.

The array substrate and the display panel of the embodiments of the present disclosure are described in detail above. Specific embodiments are used in this specification to describe the principle and implementation of the present disclosure. The descriptions of the above embodiments are only used to help understanding the technical solution and core idea of the present disclosure. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. An array substrate, comprising:
    a display area and a non-display area surrounding the display area;
    a plurality of pixels disposed in the display area, wherein each of the pixels comprises a first sub-pixel and a second sub-pixel arranged along a column direction, the plurality of pixels comprise a plurality of pixel rows and a plurality of pixel columns, in each of the pixel rows, a first sub-pixel row and an adjacent second sub-pixel row are separated by a first interval, and two adjacent pixel rows are separated by a second interval;
    a plurality of data lines extending along the column direction and connected to the plurality of pixel columns;
    a plurality of gate lines extending along a row direction and connected to the plurality of pixel rows, wherein each of the gate lines is disposed in a corresponding first interval;
    a plurality of shared electrode lines extending along the row direction, wherein each of the shared electrode lines is disposed in a corresponding first interval and is adjacent to a corresponding gate line;
    a plurality of common electrode lines, wherein each of the common electrode lines is disposed between two adjacent first intervals, each of the common electrode lines comprises a main electrode and a plurality of comb-shaped electrodes, the main electrode extends along the row direction and disposed in a corresponding second interval, and the plurality of comb-shaped electrodes extend along the column direction and extend toward at least one adjacent first interval;
    a shared electrode bus line extending along the column direction, disposed in the non-display area, and connected to the plurality of shared electrode lines; and
    a common electrode bus line extending along the column direction, disposed in the non-display area, and connected to each of the main electrodes,
    wherein in one of the pixels, the pixel comprises a shared thin film transistor, the first sub-pixel comprises a first thin film transistor and a first pixel electrode, and the second sub-pixel comprises a second thin film transistor and a second pixel electrode;
    gates of the shared thin film transistor, the first thin film transistor, and the second thin film transistor are connected to a same gate line;
    sources of the first thin film transistor and the second thin film transistor are connected to a same data line;
    a drain of the first thin film transistor is connected to the first pixel electrode via a first through hole, and a drain of the second thin film transistor is connected to the second pixel electrode via a second through hole;
    a drain of the shared thin film transistor is connected to the drain of the second thin film transistor, a source of the shared thin film transistor is connected to one of the shared electrode lines via a third through hole, and the gate line and the shared electrode line respectively connected to the gate and the source of the shared thin film transistor are disposed in a same first interval; and
    wherein the first through hole, the second through hole, and the third through hole all are disposed corresponding to the shared electrode line.

2. The array substrate according to claim 1, wherein the plurality of gate lines, the plurality of shared electrode lines, and the plurality of common electrode lines are arranged on a first metal layer; and
    the shared electrode bus line is arranged in the first metal layer, or the shared electrode bus line and the plurality of data lines are arranged in a second metal layer.

3. The array substrate according to claim 1, wherein the source of the first film transistor and the source of the second film transistor are disposed side by side in the row direction, and an opening direction of the source of the first film transistor is the same as that of the source of the second film transistor.

4. An array substrate, comprising:
    a display area and a non-display area surrounding the display area;
    a plurality of pixels disposed in the display area, wherein each of the pixels comprises a first sub-pixel and a second sub-pixel arranged along a column direction, the plurality of pixels comprise a plurality of pixel rows and a plurality of pixel columns, and in each of the pixel rows, a first sub-pixel row and an adjacent second sub-pixel row are separated by a first interval;
    a plurality of data lines extending along the column direction and connected to the plurality of pixel columns;
    a plurality of gate lines extending along a row direction and connected to the plurality of pixel rows, wherein each of the gate lines is disposed in a corresponding first interval;
    a plurality of shared electrode lines extending along the row direction, wherein each of the shared electrode lines is disposed in a corresponding first interval and is adjacent to a corresponding gate line;
    a plurality of common electrode lines, wherein each of the common electrode lines is disposed between two adjacent first intervals; and a shared electrode bus line extending along the column direction, disposed in the non-display area, and connected to the plurality of shared electrode lines, wherein in one of the pixels, the pixel comprises a shared thin film transistor, the first sub-pixel comprises a first thin film transistor and a first pixel electrode, and the second sub-pixel comprises a second thin film transistor and a second pixel electrode;

gates of the shared thin film transistor, the first thin film transistor, and the second thin film transistor are connected to a same gate line;

sources of the first thin film transistor and the second thin film transistor are connected to a same data line;

a drain of the first thin film transistor is connected to the first pixel electrode via a first through hole, and a drain of the second thin film transistor is connected to the second pixel electrode via a second through hole;

a drain of the shared thin film transistor is connected to the drain of the second thin film transistor, a source of the shared thin film transistor is connected to one of the shared electrode lines via a third through hole, and the gate line and the shared electrode line respectively connected to the gate and the source of the shared thin film transistor are disposed in a same first interval; and wherein the first through hole, the second through hole, and the third through hole all are disposed corresponding to the shared electrode line.

5. The array substrate according to claim 4, wherein the plurality of gate lines, the plurality of shared electrode lines, and the plurality of common electrode lines are arranged on a first metal layer.

6. The array substrate according to claim 5, wherein the plurality of shared electrode lines and the shared electrode bus line are arranged on different layers, and the shared electrode bus line and the plurality of data lines are arranged on a second metal layer.

7. The array substrate according to claim 4, further comprising a base, wherein in one of the pixels, the first sub-pixel comprises a first pixel electrode, and the second sub-pixel comprises a second pixel electrode; and orthographic projections of the first pixel electrode and the second pixel electrode on the base overlap with an orthographic projection of at least one of the repair electrodes on the base.

8. The array substrate according to claim 4, further comprising a base, wherein an orthographic projection of the plurality of shared electrode lines on the base and an orthographic projection of the plurality of common electrode lines on the base do not overlap with each other.

9. The array substrate according to claim 4, wherein two adjacent pixel rows are separated by a second interval;

wherein each of the common electrode lines comprises a main electrode and a plurality of comb-shaped electrodes;

the main electrode extends along the row direction and is disposed in a corresponding second interval;

the plurality of comb-shaped electrodes extend along the column direction and extend toward at least one adjacent first interval; and the array substrate further comprises a common electrode bus line extending along the column direction, disposed in the non-display area, and connected to each of the main electrodes.

10. The array substrate according to claim 4, wherein the source of the first film transistor and the source of the second film transistor are disposed side by side in the row direction, and an opening direction of the source of the first film transistor is the same as that of the source of the second film transistor.

11. A display panel, comprising:
an array substrate;
a color filter substrate disposed opposite to the array substrate; and
a liquid crystal layer disposed between the array substrate and the color filter substrate, wherein the array substrate comprises:
a display area and a non-display area surrounding the display area;
a plurality of pixels disposed in the display area, wherein each of the pixels comprises a first sub-pixel and a second sub-pixel arranged along a column direction, the plurality of pixels comprise a plurality of pixel rows and a plurality of pixel columns, and in each of the pixel rows, a first sub-pixel row and an adjacent second sub-pixel row are separated by a first interval;
a plurality of data lines extending along the column direction and connected to the plurality of pixel columns;
a plurality of gate lines extending along a row direction and connected to the plurality of pixel rows, wherein each of the gate lines is disposed in a corresponding first interval;
a plurality of shared electrode lines extending along the row direction, wherein each of the shared electrode lines is disposed in a corresponding first interval and is adjacent to a corresponding gate line;
a plurality of common electrode lines, wherein each of the common electrode lines is disposed between two adjacent first intervals; and
a shared electrode bus line extending along the column direction, disposed in the non-display area, and connected to the plurality of shared electrode lines,
wherein in one of the pixels, the pixel comprises a shared thin film transistor, the first sub-pixel comprises a first thin film transistor and a first pixel electrode, and the second sub-pixel comprises a second thin film transistor and a second pixel electrode;
gates of the shared thin film transistor, the first thin film transistor, and the second thin film transistor are connected to a same gate line;
sources of the first thin film transistor and the second thin film transistor are connected to a same data line;
a drain of the first thin film transistor is connected to the first pixel electrode via a first through hole, and a drain of the second thin film transistor is connected to the second pixel electrode via a second through hole;
a drain of the shared thin film transistor is connected to the drain of the second thin film transistor, a source of the shared thin film transistor is connected to one of the shared electrode lines via a third through hole, and the gate line and the shared electrode line respectively connected to the gate and the source of the shared thin film transistor are disposed in a same first interval; and
wherein the first through hole, the second through hole, and
the third through hole all are disposed corresponding to the shared electrode line.

12. The display panel according to claim 11, wherein the plurality of gate lines, the plurality of shared electrode lines, and the plurality of common electrode lines are arranged on a first metal layer.

13. The display panel according to claim 12, wherein the shared electrode bus line is arranged on the first metal layer.

14. The display panel according to claim 12, wherein the plurality of shared electrode lines and the shared electrode bus line are arranged on different layers, and the shared electrode bus line and the plurality of data lines are arranged on a second metal layer.

15. The display panel according to claim 11, wherein the array substrate further comprises a base, wherein in one of the pixels, the first sub-pixel comprises a first pixel electrode, and the second sub-pixel comprises a second pixel electrode; and orthographic projections of the first pixel electrode and the second pixel electrode on the base overlap with an orthographic projection of at least one of the repair electrodes on the base.

16. The display panel according to claim 11, wherein the array substrate further comprises a base, wherein an orthographic projection of the plurality of shared electrode lines on the base and an orthographic projection of the plurality of common electrode lines on the base do not overlap with each other.

17. The display panel according to claim 11, wherein two adjacent pixel rows are separated by a second interval;

wherein each of the common electrode lines comprises a main electrode and a plurality of comb-shaped electrodes;

the main electrode extends along the row direction and is disposed in a corresponding second interval;

the plurality of comb-shaped electrodes extend along the column direction and extend toward at least one adjacent first interval; and the array substrate further comprises a common electrode bus line extending along the column direction, disposed in the non-display area, and connected to each of the main electrodes.

18. The display panel according to claim 11, wherein the source of the first film transistor and the source of the second film transistor are disposed side by side in the row direction, and an opening direction of the source of the first film transistor is the same as that of the source of the second film transistor.

* * * * *